United States Patent [19]
Winkler et al.

[11] 3,988,752
[45] Oct. 26, 1976

[54] MEANS FOR SUPPORTING SOURCES OF ARTIFICIAL LIGHT IN PHOTOGRAPHIC APPARATUS HAVING EXPANSIBLE HOUSINGS

[75] Inventors: Alfred Winkler, Munich; Dieter Engelsmann, Unterhaching; Karl Wagner, Munich, all of Germany

[73] Assignee: AGFA-Gevaert, A.G., Leverkusen, Germany

[22] Filed: Mar. 24, 1975

[21] Appl. No.: 561,323

[30] Foreign Application Priority Data
Mar. 26, 1974 Germany............................ 2414472
May 31, 1974 Germany............................ 2426436

[52] U.S. Cl. ............................... 354/126; 240/1.3; 354/187
[51] Int. Cl.² .................. G03B 17/04; G03B 15/04
[58] Field of Search ........... 354/126, 143, 144, 145, 354/148, 187, 288; 240/1.3

[56] References Cited
UNITED STATES PATENTS

| | | | |
|---|---|---|---|
| 2,783,696 | 3/1957 | Sewig .................. | 354/126 |
| 3,273,479 | 9/1966 | Jakob ................. | 240/1.3 X |
| 3,315,580 | 4/1967 | Fisher ................. | 240/1.3 |
| 3,463,068 | 8/1969 | Engelsmann........... | 354/144 |
| 3,465,138 | 9/1969 | Long................... | 240/1.3 |
| 3,735,679 | 5/1973 | Winkler............... | 354/144 X |
| 3,805,282 | 4/1974 | Erlichman............. | 354/144 |
| 3,864,705 | 2/1975 | Winkler............... | 354/144 |
| 3,882,519 | 5/1975 | Winkler et al......... | 354/145 X |

*Primary Examiner*—Joseph W. Hartary
*Attorney, Agent, or Firm*—Michael J. Striker

[57] ABSTRACT

A miniature still camera wherein a cover of the housing is reciprocable with respect to the lens-containing section of the housing and the cover contains a socket for indexible or non-indexible sources of artificial illumination. The camera is ready to make an exposure when the cover is moved to an extended position to increase the length of the housing; the source of artificial light is then sufficiently remote from the lens to insure satisfactory exposures of color film to artificial light even though the source of artificial light is not connected to the socket by an extender. An indexible socket can be rotated in response to movement of the cover with respect to the lens-containing section, and the cover can contain a mechanism which fires percussively ignitable flash lamps in response to actuation of the camera release. When the length of the housing is reduced, the socket is received in the space between the objective and the eyepiece of the viewfinder in the lens-containing section of the housing.

14 Claims, 11 Drawing Figures

MEANS FOR SUPPORTING SOURCES OF ARTIFICIAL LIGHT IN PHOTOGRAPHIC APPARATUS HAVING EXPANSIBLE HOUSINGS

BACKGROUND OF THE INVENTION

The present invention relates to photographic apparatus in general, and more particularly to still cameras. Still more particularly, the invention relates to improvements in still cameras (e.g., in miniature still cameras capable of being stored in a pocket or purse) which can be used for the making of exposures in daylight as well as with artificial illumination of the subject or scene.

The commonly owned U.S. Pat. No. 3,864,705 to Winkler discloses a still camera wherein the housing comprises a first section or body which contains the picture taking lens, the shutter, the camera release, the viewfinder and a socket for attachment of sources of artificial illumination of the subject, and a second section or cover which conceals the lens and the viewfinder objective when it assumes a predetermined end position (called first or closing position) with respect to the body. When the cover is not locked in closing position, it is propelled or pulled to a second or extended position in which the camera is ready to make an exposure. The movement of the cover from extended position to the closing position and back to extended position results in automatic cocking of the shutter, in the transport of film by the length of a frame and in indexing of the socket if the latter is of the type which can receive the foot of a multiple flash lamp holder known as flashcube or magicube.

A drawback of miniature still cameras of the just outlined character is that, when the housing contains color film and exposure is to be made with artificial illumination of the subject or scene, the exposed color film frames exhibit so-called "red eyes" which develop due to the fact that the source of light is too close to the picture taking lens. The distance between the socket and the picture taking lens cannot be increased at will because the first section or body of the camera housing is very small; in fact, an important feature of such cameras is that the housing is sufficiently compact to be readily insertable into a small pocket or to occupy a minimum amount of space in a purse when the cover is moved to its closing position.

In an attempt to avoid the formation of red eyes, the manufacturers of miniature still cameras having expansible housings furnish each camera with a so-called extender which is an elongated attachment having a foot at one end and a recess at the other end. The foot is identical with that on the base of a flashcube or magicube so that it can enter the recess of the socket in the body of the still camera, and the recess of the extender is similar to the recess of the socket so that it can receive the foot of a flashcube or magicube. Thus, when the extender is attached to and is indexible by the socket, and when the extender supports a multiple flash lamp holder, the flash lamps are sufficiently remote from the picture taking lens to avoid the development of red eyes on color film frames. However, the extender exhibits a number of drawbacks. Thus, it contributes to the cost of the camera, it projects from the upper side of the body of the camera housing to affect the appearance of the camera and to prevent the insertion of the camera into a rather narrow passage or slot during picture taking, it must be removed whenever the camera is to be stored, and it is likely to be misplaced or lost to thus prevent the making of satisfactory exposures of color film with artificial illumination of the subject or scene.

SUMMARY OF THE INVENTION

An object of the invention is to provide a photographic apparatus, particularly a still camera having an expansible housing, with a support which can accept one or more types of artificial light sources and which is sufficiently remote from the picture taking lens to prevent the formation of red eyes or analogous undesirable phenomena on exposed film frames when the apparatus makes exposures with artificial illumination of the subject or scene.

Another object of the invention is to provide a miniature still camera which can satisfactorily expose color film to artificial light without resorting to an extender.

A further object of the invention is to provide a novel and improved cover for a still camera whose housing can be extended for the making of exposures and reduced in size for storage in a miniature case, pocket or purse.

An additional object of the invention is to provide a cover which supports a source of artificial light and can change the orientation of such source in response to movement with respect to the picture taking lens.

Still another object of the invention is to provide a novel and improved miniature still camera which can be designed to make exposures with artificial illumination of the subject or scene by resorting to any one of commercially available light sources including discrete flash lamps, flashcubes, magicubes, flashbars and electronic or battery-operated flash units.

The invention is embodied in a photographic apparatus, particularly in a still camera, which comprises a housing having a first and a second section, a picture taking lens in a first section, and a support for sources of artificial light in the second section. One of the sections is movable with respect to the other section between a first position in which the lens is nearer to the support and a second position in which the support is more distant from the lens. The one section is preferably the second section, and this second section is preferably reciprocable between the first and second positions. In the second position of the second section, the distance between the picture taking lens and a source of artificial light which is separably connected to the support suffices to insure that the camera can expose color film with artificial illumination of the subject but without the development of red eyes or similar defects.

The support may constitute a socket which is indexible in the second section and is indexed in response to movement of the second section between its first and second positions, for example, from the second to the first position. Such indexible socket can accept flashcubes or magicubes. If the socket is fixedly mounted in the second section, it can be designed to take flashbars, other types of containers for several discrete flash lamps, electronic or battery-operated flash units, holders for discrete flash lamps and/or other sources of artificial light which need not be indexed after each exposure with artificial illumination of the subject or scene.

It is preferred to mount the optical elements of the viewfinder in the first section of the housing in such a way that the support is received in the space between such optical elements when the second section is moved to the first position. If the second section has a battery compartment, the compartment is preferably located sufficiently close to the support to be receivable in the aforementioned space between the optical elements of the viewfinder when the second section is moved to the first position.

The novel features which are considered as characteristic for the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
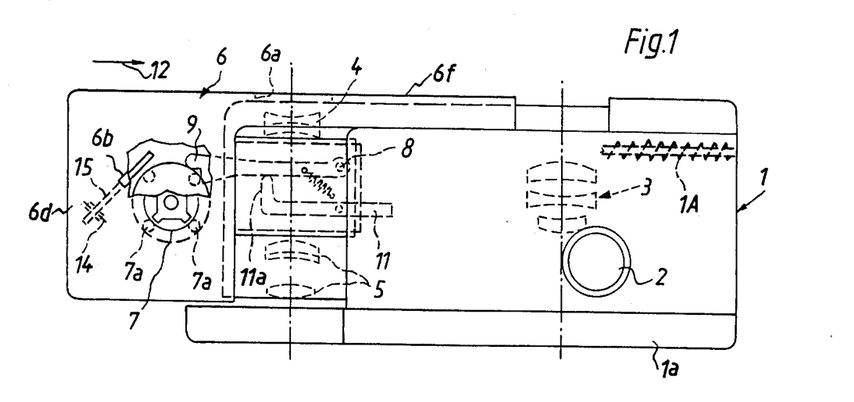
FIG. 1 is a schematic plan view of a miniature still camera with expansible housing which embodies one form of the invention.
Figure 2:
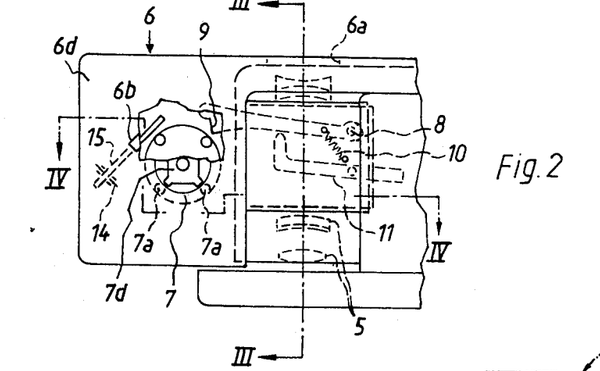
FIG. 2 is a plan view of a portion of the still camera, with the means for indexing a socket for multiple flash lamp holders shown in the inoperative position.
Figure 3:
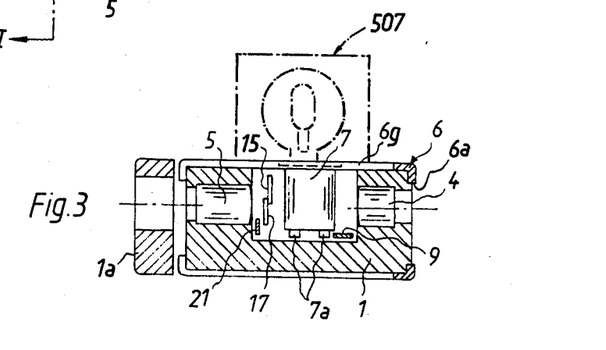
FIG. 3 is a sectional view as seen in the direction of arrows from the line III—III of FIG. 2.

Referring first to FIGS. 1 to 3, there is shown a miniature still camera with an expansible housing having a first or main housing section 1 (hereinafter called body) and a second housing section 6 (hereinafter called cover). The body 1 contains a picture taking lens 3 and supports a release including a deformable membrane 2 which is mounted in the top wall of the body. A rear wall or door 1a of the body 1 is pivotable or slidable from the illustrated closed position so as to allow for insertion or removal of photographic film, preferably a supply of roll film which is stored in a customary cassette.

The body 1 further contains the optical elements (objective 4 and eyepiece 5) of a viewfinder whose axis is parallel to the optical axis of the picture taking lens 3. The cover 6 is movable to and from the second or extended position of FIGS. 1 and 2; in such extended position, the front wall 6f of the cover 6 allows scene light to reach the picture taking lens 3 and an opening 6a in the front wall 6f admits light into the objective 4 of the viewfinder. The left-hand portion 6d of the cover 6 (as viewed in FIG. 1 or 2) is cupped, and its top wall supports an indexible support or socket 7 for multiple flash lamp holders 507. When the cover 6 is moved from the extended position of FIG. 1 or 2 to the first or closing position (FIG. 6), is front wall 6f overlies the picture taking lens 3, the opening 6a is out of register with the viewfinder objective 4 and the socket 7 is located in the space between the objective 4 and eyepiece 5 of the viewfinder. The cover 6 can be held in such closing position by a suitable locking device in a manner as disclosed, for example, in the aforementioned commonly owned U.S. Pat. No. 3,864,705 granted Feb. 4, 1975. This patent further describes and shows a spring (see the spring 1A in FIG. 1) which tends to maintain the cover 6 in the extended position of FIG. 1. If the user of the still camera wishes to make an exposure, the aforementioned locking device is rendered inoperative so that the spring 1A can propel the cover 6 to the extended position of FIGS. 1 or 2. The camera is then ready to make an exposure because the lens 3 is unobstructed and the user can observe the selected subject or scene by looking forwardly through the eyepiece 5 of the viewfinder. Furthermore, the film is automatically transported by the length of a frame while the cover 6 moves to its closing or extended position, and such transport of film is terminated when the cover 6 reassumes the extended position of FIG. 1 after having been moved to the closing position. Still further, the movement of cover 6 from or to the extended position of FIG. 1 preferably results in closing and cocking of the shutter (this shutter includes a pivotable lever-like element 11 shown in FIGS. 1 and 2) so that an exposure can be made as soon as the cover 6 reaches the position of FIG. 1 and the user thereupon deforms the membrane 2 of the camera release. If a single exposure is desired, the cover 6 is thereupon returned to the closing position and the aforementioned locking device is actuated to retain the cover in the closing position. If the user wishes to make two or more successive exposures, the locking device remains inoperative and the user simply pushes the cover 6 in the direction indicated by arrow 12 (FIG. 1), i.e., to the closing position, to thereupon release the cover to the action of the spring 1A which automatically returns the cover to the extended position of FIG. 1. The camera is then ready to make the next exposure. The same procedure can be repeated as often as desired until the supply of unexposed film in front of the door 1a is exhausted. It is clear that, prior to the making of an exposure, the user can hold the cover 6 against any movement or against any appreciable movement and moves the body 1 counter to the direction indicated by the arrow 12, whereupon the spring 1A automatically returns the body 1 to the position of FIG. 1 and the camera is ready to make an exposure. As a rule, the user will prefer to move the cover 6 because it is a lightweight component and because the optical elements 3, 4, 5 are mounted in the body 1, i.e., the user can continue to look into the viewfinder while the cover 6 is being moved back and forth to prepare the camera for the next exposure. The aforementioned U.S. Pat. No. 3,864,705 to Winkler discloses the manner in which the cover 6 can transport the film and cock the shutter during movement to or from the extended position. The entire disclosure of this patent, exclusive of the mounting of the socket for multiple flash lamp holders, is incorporated by reference into the present specification.

The mounting of the support or socket 7 in the cover 6 (i.e., in that section of the housing which is movable relative to the housing section containing the picture taking lens or vice versa) constitutes an important and advantageous feature of the improved camera. Thus, the socket 7 is already remote from the picture taking lens 3 when the cover 6 is maintained by hand or locked in the closing position of FIG. 6, and the distance between the lens 3 and socket 7 increases appreciably when the cover 6 is moved to the extended position of FIG. 1 or 2, i.e., when the camera is ready to make exposures in daylight or with artificial illumination of the subject. The socket 7 comprises four equally spaced projections or pins 7a which extend in a direction away from the top wall of the cover 6 and can be engaged by an indexing or displacing pawl 9 serving to rotate the socket 7 through angles of 90° in response to each movement of the cover 6 in the direction indicated by arrow 12 provided that such movement of the cover was preceded by an actuation of the shutter, i.e., by a deformation of the release membrane 2. The upper end face of the socket 7 has a substantially cruciform recess 7d which can receive the foot of a conventional multiple flash lamp holder 507, e.g., a holder of the type known as flashcube or magicube. The top wall of the cover 6 has a preferably circular opening or cutout 6g which affords access to the recess 7d of the socket 7.

When the foot of a multiple flash lamp holder 507 is inserted into the recess 7d of the socket 7 and the spring 1A holds the cover 6 in the extended position of FIG. 1, the flash lamp which faces the subject or scene is sufficiently remote from the lens 3 to prevent the development of the so-called red eyes on that color film frame which is located behind the lens 3 while the camera makes an exposure with artificial illumination of the subject or scene. Presently known miniature still cameras must be furnished with an extender having a foot which is insertable into the recess of a socket in the body of the camera and which has a similar recess for the foot of a flashcube or magicube. This insures that the flash lamp which faces the subject or scene is sufficiently remote from the foremost unexposed frame of color film in the camera to prevent the development of red eyes. An extender contributes to the cost of a conventional camera and is likely to be lost or misplaced. Thus, by the simple expedient of mounting the picture taking lens and the socket in two discrete sections of a camera housing which sections are movable relative to each other so that the distance between the lens and the socket increases when the camera is ready to make an exposure, the improved camera can make highly satisfactory exposures of color film frames without resorting to an extender. Moreover, the socket 7 occupies space (between the optical elements 4 and 5 of the viewfinder) which is readily available in the camera when the cover 6 is moved to its closing position so that the mounting of the socket in the cover does not contribute to the bulk of the camera when the latter is not in use. The space between the optical elements 4 and 5 is sufficiently large to accommodate the socket as well as such parts which are necessary to connect a flashcube with a battery or another suitable source of electrical energy and/or the parts which are needed to index the socket.

The pawl 9 which serves to index the socket 7 is turnable on a pivot member 8 which is mounted in the body 1. When the pawl 9 assumes the operative position of FIG. 1 and the cover 6 is moved in the direction indicated by the arrow 12, the pallet of the pawl 9 is engaged by the nearest pin 7a whereby the pallet indexes the socket 7 through 90° in a counterclockwise direction, as viewed in FIG. 1. This places an unfired flash lamp in an optimum position for illumination of a subject or scene. In order to prevent repeated indexing of the socket 7 when the cover 6 is repeatedly moved to and from the extended position of FIG. 1 without actuation of the camera release (membrane 2) in such extended position, the pallet of the pawl 9 cannot be engaged by a pin 7a until and unless the shutter has been actuated in the extended position of the cover 6. To this end, the shutter comprises the aforementioned element 11 which is coupled to the indexing pawl 9 by a helical spring 10 and automatically assumes the position of FIG. 2 when the shutter is cocked. The projection 11a of the shutter element 11 then maintains the pawl 9 in the inoperative position of FIG. 2 so that the cover 6 can be reciprocated as often as desired but the angular position of the socket 7 with respect to the cover remains unchanged. However, if the shutter is actuated in response to deformation of the membrane 2 while the cover 6 dwells in the extended position of FIG. 2, the element 11 returns to the position of FIG. 1 and the spring 10 pivots the pawl 9 counterclockwise (i.e., back to the position of FIG. 1) so that the next movement of cover 6 in the direction indicated by arrow 12 results in renewed indexing of the socket 7. The shutter can be cocked in response to movement of the cover 6 from the closing to the extended position, i.e., the position of the element 11 can remain unchanged while the cover 6 moves in the direction indicated by the arrow 12 (so that the pawl 9 can index the socket 7 when necessary), but the element 11 moves to the position of FIG. 2 when the cover 6 thereupon returns to the extended position under the action of the spring 1A. However, it is equally possible to cock the shutter in response to the last stage of movement of the cover 6 to its closing position, as long as the pawl 9 can index the socket 7, subsequent to completion of an exposure, before the element 11 moves from the position of FIG. 1 to that shown in FIG. 2.

As mentioned above, the housing of the camera can contain a battery or another suitable source of electrical energy, for example, when a multiple flash lamp holder which is to be attached to the socket 7 is a flashcube. The camera then further comprises suitable conductor means which connect (in response to deformation of the membrane 2) the energy source with that unfired flash lamp which faces the subject or scene. The membrane 2 can effect the closing of a synchronizing switch which insures that the flash lamp facing the subject or scene is fired at the exact moment when the shutter is open to admit scene light to the picture taking lens 3. However, a miniature still camera with an expansible housing is more likely to be used with percussively ignitable flash lamps, i.e., with flash lamps which are installed in magicubes. Therefore, the still camera of FIGS. 1–3 is preferably equipped with means for automatically initiating the firing or ignition of that percussively ignitable flash lamp in a magicube 507 which faces the subject or scene at the exact moment when the shutter opens in response to deformation of the membrane 2. Such automatic ignition initiating means is shown on a larger scale in FIGS. 4 to 6.

The output member of the ignition initiating means is an impeller 15 which is pivotably mounted in the portion 6d of the cover 6 on a pin 14 and has a suitably curved protuberance 15a located in the path of a lobe 17b on an intermediate lever 17 which is turnable in the cover 6 on a pivot member 16. The end portion 15b of the impeller 15 can be expelled upwardly through a suitable aperture or slot 6b in the top wall of the cover 6. When the end portion 15b is expelled from the cover 6 to assume the position shown in FIG. 5, it displaces a firing wire which is installed in the interior of that magicube 507 which is connected to the socket 7 whereby the wire effects the firing of the flash lamp which faces the subject or scene in a manner well known from the art of percussively ignitable flash lamps.

The intermediate lever 17 further comprises a projection in the form of a pin 17a which is normally engaged by an edge face or shoulder 21a of a reciprocable motion-transmitting member 21. The latter further comprises a suitably inclined cam face 21b which is adjacent to the shoulder 21a and can be moved into engagement with a pin-shaped stop 22 constituting a ramp along which the cam face 21b can slide in order to disengage the shoulder 21a from the pin 17a of the intermediate lever 17.

Figure 4:
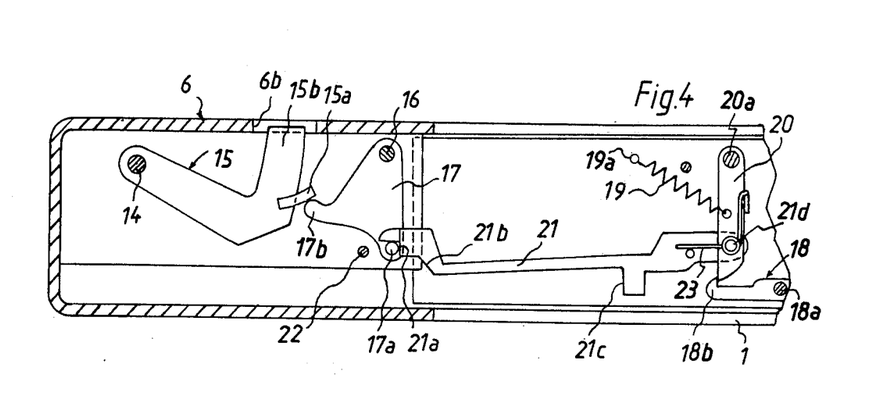
FIG. 4 is an enlarged sectional view as seen in the direction of arrows from the line IV—IV of FIG. 2.
Figure 5:
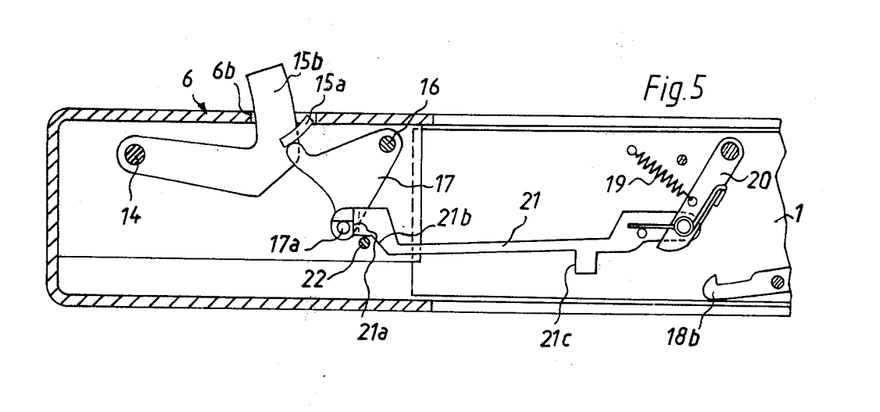
FIG. 5 illustrates the structure of FIG. 4 but with the means for effecting the firing of a percussively ignitable flash lamp shown in operative position.

The body 1 contains a pivot member 18a for a blocking lever 18 which is pivoted from the retaining position of FIG. 4 to the releasing position of FIG. 5 in response to actuation of the shutter or directly in response to deformation of the membrane 2. The tooth 18b at the left-hand end of the blocking lever 18 normally engages and holds the lower end portion of a one-armed lever 20 which is turnable in the body 1 on a pivot member 20a and is biased clockwise by a relatively strong helical spring 19 one end of which is secured to a post 19a in the body 1. The right-hand end portion of the motion-transmitting member 21 is articulately connected to the lever 20 by a pin 21d, and a torsion spring 23 reacts against the lever 20 and tends to pivot the member 21 counterclockwise, as viewed in FIG. 4, 5 or 6, so that the member 21 invariably bears against the stop 22. The motion-transmitting member 21 further carries a projection or lug 21c which abuts against the stop 22 when the blocking lever 18 releases the lever 20 to the action of the spring 19 and not later than when the cover 6 is moved to the closing position of FIG. 6.

The lever 20 is moved to the position of FIG. 4 in response to cocking of the shutter, e.g., by a portion of or by a part mounted on the cover 6. The lower end portion of this lever is then automatically engaged by the tooth 18b or the blocking lever 18 and the spring 19 stores a requisite amount of energy.

When the cover 6 is held in extended position by the spring 1A and the camera is ready to make an exposure with artificial illumination of the subject or scene, the parts of the means for initiating the firing of that flash lamp which faces the subject assume the positions shown in FIG. 4. Thus, the blocking lever 18 engages the lever 20, the impeller 15 is retracted into the cover 6, the lobe 17b abuts against the protuberance 15a, and the shoulder 21a of the motion-transmitting member 21 abuts against the pin 17a of the intermediate lever 17.

If the user of the camera makes an exposure by deforming the membrane 2 of the release means, the blocking lever 18 is moved to the releasing position of FIG. 5 and the spring 19 contracts to move the motion-transmitting member 21 to the position shown in FIG. 5. The shoulder 21a pivots the intermediate lever 17 through the medium of the pin 17a whereby the lobe 17b pivots the impeller 15 counterclockwise, as viewed in FIG. 4, so that the end portion 15b moves through and upwardly beyond the slot 6b and the magicube 507 which is attached to the socket 7 fires that one of its lamps which faces the subject or scene. As the spring 19 continues to contract, the cam face 21b slides along the stop 22 and causes the motion-transmitting member 21 to pivot clockwise so that the shoulder 21a moves out of register with the pin 17a. The movement of the motion-transmitting member 21 under the action of the spring 19 is terminated when the lever 20 engages a stop 24 in the body 1.

Figure 6:
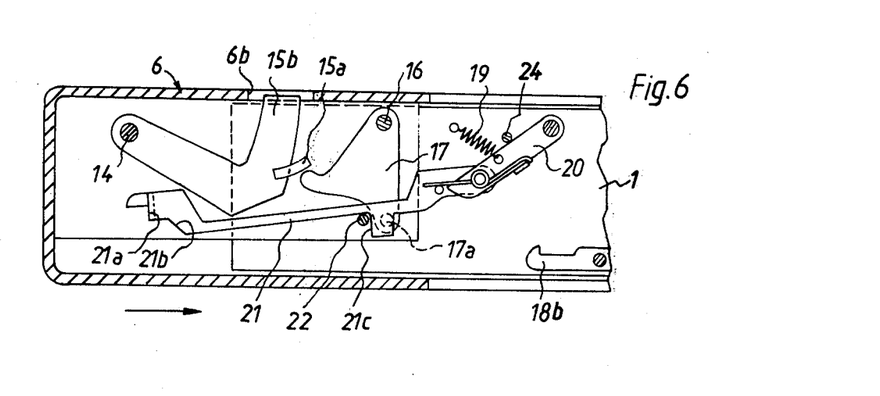
FIG. 6 illustrates the structure of FIGS. 4 or 5 but with one of the housing sections shifted relative to the other housing section.

The lever 17 is preferably biased clockwise, as viewed in FIGS. 4-6, by a weak torsion spring or the like, not shown, so that its lobe 17b invariably abuts against the protuberance 15a of the impeller 15. The stop 22 can move into abutment with the lug 21c of the motion-transmitting member 21 when the cover 6 is moved to the closing position of FIG. 6. It is normally preferred to place the lug 21c nearer to the cam face 21b than shown in FIGS. 4-6 so that the stop 22 (which shares the movements of the corner 6 relative to the body 1) can engage the lug 21c during its movement toward the closing position of FIG. 6 and thereby pivots the lever 20 counterclockwise by simultaneously stressing the spring 19. If the blocking lever 18 returns to the retaining position of FIG. 4 not later than when the cover 6 moves to the closing position of FIG. 6 (this is actually shown in FIG. 6), the tooth 18b automatically reengages the lever 20 as soon as the stop 22 returns the lever 20 to the position of FIG. 4 through the medium of the motion-transmitting member 21 and pivot pin 21d.

The impeller 15 can be automatically retracted into the cover 6 (i.e., from the position of FIG. 5 to the position of FIG. 6 which latter position corresponds to that shown in FIG. 4), for example, by one of four customary ramps provided at the underside of the magicube 507 and bearing against the end portion 15b while the socket 7 is being indexed by the pawl 9 in response to movement of the cover 6 in the direction indicated by the arrow 12.

The parts 20, 21 constitute an actuating means for a composite impeller including the parts 15, 17. FIG. 4 shows the actuating means in idle position, and FIG. 5 shows the actuating means in operative position. The cam face 21b cooperates with the stop 22 to allow for movement of the actuating means 20, 21 beyond the operative position of FIG. 5 (i.e., to the end position of FIG. 6) under the action of the spring 19. Thus, the pin 22 can serve to disengage the actuating means 20, 21 from the composite impeller 15, 17 as well as to move the actuating means 20, 21 back to the idle position of FIG. 4 in response to movement of the section 6 to its closing position.

It is clear that the camera of FIGS. 1 to 6 can be modified in a number of ways without departing from the spirit of the invention. For example, the socket 7 can be indexed by a rack and pinion drive, or by a gear train, whenever the cover 6 moves to the closed position of FIG. 6 or to the extended position of FIG. 1. The camera then comprises suitable clutch means or the like which deactivates the rack and pinion drive or the gear train when the movement of cover 6 from the extended position of FIG. 1 is not preceded by the making of an exposure. Furthermore, the impeller can be moved to the extended position of FIG. 5 by a different linkage, by a gear train or by an electromagnet. All that counts is to insure that the socket 7 is indexed subsequent to the making of an exposure but not if the movement of cover 6 from extended position is not preceded by the making of an exposure, and that the impeller 15 is expelled from the cover and is caused to initiate the firing of a precussively ignitable flash lamp in response to deformation of the membrane 2.

Figure 7:
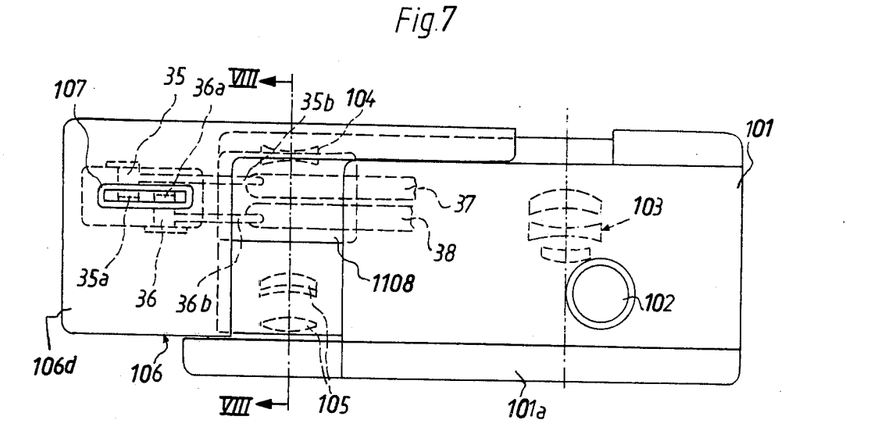
FIG. 7 is a schematic plan view of a second still camera.
Figure 8:
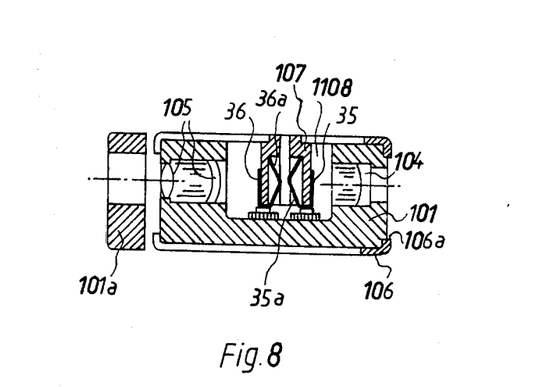
FIG. 8 is a sectional view as seen in the direction of arrows from the line VIII—VIII of FIG. 7.

FIGS. 7 and 8 show a second still camera. All such parts of this camera which are identical with or clearly analogous to the corresponding parts of the camera of FIGS. 1–6 are denoted by similar reference characters plus 100. The support 107 in the cupped portion 106d of the cover 106 is a non-indexible socket which can be used to support detachable multiple flash lamp holders of the type known as flashbars (see the flashbar 43 in FIG. 10) or any other types of flash lamp holders which contain two or more discrete flash lamps and which need not be rotated or otherwise moved in order to prepare successive flash lamps for firing. The support 107 can further serve as a socket for the foot of an electronic flash unit, as a socket for the foot of a battery-operated flash unit, or for reception of the foot of a holder for a single flash lamp, e.g., a well known holder which can removably receive one flash lamp at a time and has a reflector behind the flash lamp.

The support or socket 107 consists of insulating material, e.g., a synthetic plastic substance. This socket is connected with a conductor means including two preferably U-shaped conductors or contacts 35, 36 forming part of a circuit which must be completed in order to fire a single flash lamp, one of several flash lamps, or an electronic flash unit. The socket 107 resembles an elongated flat eyelet and the contacts 35, 36 are respectively located in front of and behind the socket, as considered in the direction of looking through the optical elements 104, 105 of the viewfinder. These contacts respectively have substantially V-shaped prongs 35a, 36a which extend into the interior of the socket 107 and elongated elastic arms 35b, 36b which extend toward the body 101. The complemetary contacts on the foot of a holder for flash lamps or an electronic flash unit engage the portions 35a, 36a of the contacts 35, 36 when such holder or flash unit is properly attached to the socket 107. The V-shaped portions 35a, 36a then bear against the adjacent complementary contacts to insure the establishment of a satisfactory electrical connection with the components of the electronic flash unit or with a flash lamp.

The body 101 contains a second conductor means including two elongated plate-like conductors 37, 38 which are respectively engaged by the arms 35b, 36b. The arrangement is preferably such that the arms 35b, 36b are biased against the respective conductors 37, 38 and/or vice versa to thus insure that the contacts 35, 36 remain electrically connected with the respective conductors 37, 38 during movement of the cover 106 relative to the body 101 as well as in both end positions of the cover. The circuit which includes the contacts 35, 36 and conductors 37, 38 further comprises a source of electrical energy (e.g., one or more miniature batteries, not shown) and a normally open synchronizing switch (not shown) which is in series with the energy source and is closed when the shutter opens to thereby connect the contacts 35, 36 with the respective poles of the energy source and to thus effect the firing of a flash lamp or of an electronic flash unit at the exact moment when the shutter is open. The shutter opens in response to deformation of the membrane 102. It is equally within the purview of the invention to replace the synchronizing switch and the battery or batteries with a piezoelectric crystal which is struck by an impeller (not shown) in response to deformation of the membrane 102 (i.e., in response to opening of the shutter) in order to supply electrical energy which is needed to fire a flash lamp or an electronic flash unit.

If desired, the flat plate-like conductors 37, 38 can be replaced with sleeve-like conductors and the arms 35b, 36b are then replaced by rods or strips which are slidably telescoped into the respective sleeve-like conductors. Analogously, the arms 35b, 36b may constitute conductive sleeves which are slidably telescoped onto rod-shaped or strip-shaped conductors corresponding to those shown at 37, 38. All that counts is to insure that the contacts 35, 36 or their equivalents remain electrically connected with the conductors 37, 38 (or their equivalents) in each position of the cover 106 relative to the body 101 or vice versa. The effective length of composite conductors 35, 37 and 36, 38 varies while the length of the housing 101, 106 increases or decreases.

When the cover 106 is pushed from the extended position of FIG. 7 to the closing position in which its front wall 106f overlies the picture taking lens 103 and the opening 106a of the front wall 106f is out of register with the objective 104 of the viewfinder, the socket 107 is received in the compartment or space 1108 between the optical elements 104, 105 of the viewfinder. The advantages of such mounting of the viewfinder and socket 107 are the same as those described for the socket 7 and viewfinder 4, 5 of FIGS. 1–6.

Figure 9:
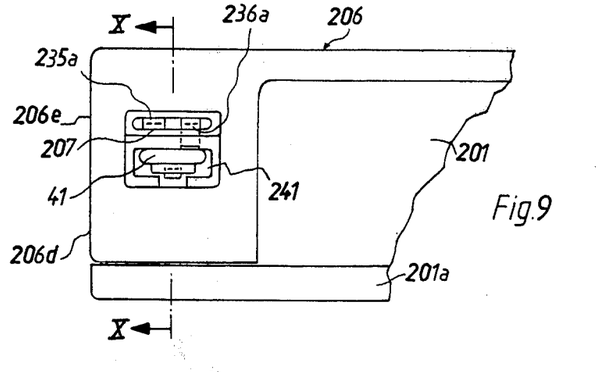
FIG. 9 is a fragmentary schematic plan view of a third still camera.
Figure 10:
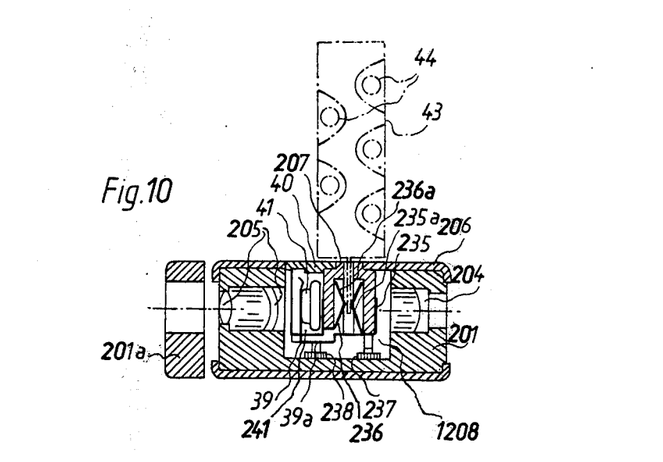
FIG. 10 is a sectional view as seen in the direction of arrows from the line X—X of FIG. 9.

FIGS. 9 and 10 illustrate a portion of a third still camera. All such component parts of this camera which are identical with or clearly analogous to the corresponding parts of the camera of FIGS. 7–8 are denoted by similar reference characters plus 100. The main difference between the cameras of FIGS. 7–8 and 9–10 is that the cover 206 provides a compartment or chamber 241 for reception of one or more batteries 41 movable with the cover relative to the body 201 of the camera housing. FIG. 10 further shows a flashbar 43 which contains several discrete flash lamps 44. When the user of the camera has fired all flash lamps 44 at the front side of the flashbar 43 (i.e., at the right-hand side, as viewed in FIG. 10), the foot of the flashbar is extracted from the support or socket 207 and is reinserted in inverted position so that the fired flash lamps face rearwardly and the unfired flash lamps face the subject.

In FIG. 9, the cover 206 is shown in the closing position. FIG. 10 shows that the distance between the optical elements 204, 205 of the viewfinder in the body 201 is sufficient to afford space (shown at 1208) for the socket 207 as well as for the battery compartment 241. The contact 236 engages the negative pole of the battery 41. An electrical connection between the contact 236 and the conductor 238 in the body 201 is established through the medium of an intermediate or auxiliary contact 39 which is preferably a spring having a bent-over portion 39a. The reference character 40 denotes a plate-like closure or cover (shown only in FIG. 10) for the upper end of the compartment 241 which receives the battery 41. The closure 40 is moved to open position when the user wishes to insert a fresh battery or remove a spent battery.

The operation of the camera including the structure of FIGS. 9–10 is analogous to that of the camera of FIGS. 7–8. Thus, the conductors 237, 238 in the body 201 of the housing are connected to a normally open synchronizing switch (not shown) which is closed in response to opening of the shutter so that one of the flash lamps 44 illuminates the subject or scene when the shutter admits scene light to the picture taking lens in the body 201.

The space 1208 is normally unoccupied in conventional cameras having expansible housings. Therefore, the mounting of the support 207 and battery compartment 241 in the cover 206 in such a way that they enter the space 1208 in closing position of the cover 206 does not contribute to the bulk of the camera housing.

Figure 11:
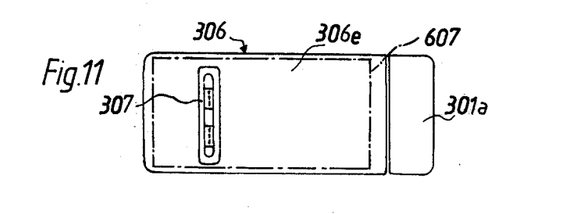
FIG. 11 is a schematic end elevational view of a fourth still camera.

FIG. 11 illustrates a portion of a fourth camera having an expansible housing including a body (see the door 301a) and a cover 306. The cover 306 has an end wall 306e which is remotest from the picture taking lens (not shown) and corresponds to the end wall 206e shown in FIG. 9. The socket 307 (which may resemble the non-idexible socket 107 or 207) is mounted in the end wall 306e, i.e., in that portion of the cover 306 which is located at a maximum distance from the picture taking lens in each and every position of the cover. Such mounting of the socket 307 further reduces the likelihood of the formation of red eyes on color film frames which are exposed in the camera of FIG. 11. For example, if the socket 307 serves to receive a flash bar 43, each and every flash lamp 44 in such flashbar is spaced apart from the picture taking lens by a distance which invariably exceeds the distance between the lens and the end wall 306e in each and every position of the cover 306 with respect to the body of the camera housing. The socket 307 can extend into the space between the optical elements (not shown) of the camera when the cover 206 is moved to its closing position.

It is clear that the socket 307 of FIG. 11 can be replaced with an indexible socket for flashcubes or magicubes. The housing of the camera then contains a modified mechanism for indexing the socket after each exposure and for firing a flash lamp, either by completing an electric circuit including a synchronizing switch and an energy source or only a piezoelectric crystal, or by causing an impeller to extend from the cover 306 in order to effect the firing of a percussively ignitable flash lamp in a manner similar to that described in connection with FIGS. 1–6.

The reference character 607 denotes the outline of an electronic flash unit which is assumed to be connected to the socket 307.

The cameras of FIGS. 7–11 exhibit many advantages of the camera of FIGS. 1 to 6. Thus, the support 107, 207 or 307 is remote from the body of the camera housing when the cover 106, 206 or 306 is moved to the extended position. This insures that, even if the camera is a miniature or subminiature camera, the source of artifical light which is secured to the support 107, 207 or 307 is sufficiently remote from the picture taking lens and from the foremost unexposed film frame that artificial illumination of the subject cannot adversely affect the exposure of color film. The aforementioned extender is not necessary.

Without further analysis, the foregoing will so fully reveal the gist of the present invention that others can be applying current knowledge, readily adapt it for various applications without omitting features which fairly consitute essential characteristics of the generic and specific aspects of our contribution to the art and, therefore, such adaptations should and are intended to be comprehended within the meaning and range of equivalance of the claims.

What is claimed as new and desired to be protected by Letters Patent is set forth in the appended claims.

We claim:

1. A camera comprising: a first housing section; a viewfinder in said first section having a pair of spaced-apart lens elements; a second housing section slidable on said first section between a closed position and an extended position and forming with said first section in said closed position a closed housing; a picture-taking lens on said first housing section; a socket on said second housing section positioned between said elements in said closed position and remote from said elements in said extended position, said socket being adapted to receive a flash source; a first pair of conductors fixed in said first housing section; and a second pair of conductors fixed in said second housing section and enclosed with said first pair in said housing in said closed position of said second section, the conductors of one of said pairs riding on and continuously making electrical contact with the conductors of the other pair.

2. The camera defined in claim 1, further comprising means for yieldably biasing said second section into one of said positions.

3. The camera defined in claim 2 wherein said means for biasing continuously urges said second section into said extended position.

4. The camera defined in claim 1 wherein said second section comprises a portion which is located in front of said lens in said closed position, whereby said camera can only make exposures in said extended position of said second section.

5. The camera defined in claim 1 wherein said second section comprises a portion which is located in front of said viewfinder in said closed position, whereby a subject can only be seen through said viewfinder in said extended position of said second section.

6. The camera defined in claim 1 wherein each of said conductors of one of said pairs telescopes with a respective conductor of the other pair.

7. The camera defined in claim 1 wherein said one pair of conductors comprises a pair of discrete contacts and said other pair of conductors comprises two elongated plate-like conductors each engaged by one of said contacts.

8. The camera defined in claim 7 wherein said one pair is said first pair.

9. The camera defined in claim 7 wherein said contacts have elastic portions which bear against the respective plate-like conductors.

10. The camera defined in claim 1, further comprising a source of electrical energy connected to at least one of said conductors.

11. The camera defined in claim 10 wherein said second section is formed with a compartment receiving said source of electrical energy.

12. The camera defined in claim 10 wherein said source of electrical energy is a battery.

13. The camera defined in claim 1 wherein said source is a flashbulb.

14. The camera defined in claim 1 wherein said source is a flashbar.

* * * * *